(12) United States Patent
Ballato et al.

(10) Patent No.: US 7,206,114 B2
(45) Date of Patent: Apr. 17, 2007

(54) PLASMON-PHOTON COUPLED OPTICAL DEVICES

(75) Inventors: John Ballato, Clemson, SC (US); David L. Carroll, Winston-Salem, NC (US); Jeffrey R. Dimaio, Seneca, SC (US)

(73) Assignee: Clemson University, Anderson, SC (US)

( * ) Notice: Subject to any disclaimer, the term of this patent is extended or adjusted under 35 U.S.C. 154(b) by 0 days.

(21) Appl. No.: 11/517,780

(22) Filed: Sep. 8, 2006

(65) Prior Publication Data

US 2007/0008602 A1    Jan. 11, 2007

Related U.S. Application Data

(62) Division of application No. 10/865,237, filed on Jun. 10, 2004, now Pat. No. 7,110,154.

(51) Int. Cl.
| | |
|---|---|
| *G02F 1/03* | (2006.01) |
| *G02F 1/00* | (2006.01) |
| *G02F 1/01* | (2006.01) |
| *H01J 3/14* | (2006.01) |

(52) U.S. Cl. ............ 359/245; 359/321; 359/250; 359/279; 250/216

(58) Field of Classification Search ......... 359/245, 359/250–252, 299, 321, 279, 569; 250/216, 250/225, 226; 245/88; 356/356
See application file for complete search history.

(56) References Cited

U.S. PATENT DOCUMENTS

| | | |
|---|---|---|
| 4,382,660 A | 5/1983 | Pratt, Jr. et al. |
| 4,805,975 A | 2/1989 | Utaka et al. |
| 4,948,225 A | 8/1990 | Rider et al. |

(Continued)

OTHER PUBLICATIONS

Article—*Crucial role of metal surface in enhanced transmission through subwavelength apertures*, D. E. Grupp, H. J. Lezec, T. W. Ebbesen, K. M. Pellerin, and Tineke Thio, Applied Physics Letters, vol. 77, No. 11, Sep. 11, 2000, pp. 1569-1571.

(Continued)

*Primary Examiner*—Ricky Mack
*Assistant Examiner*—Jack Dinh
(74) *Attorney, Agent, or Firm*—Dority & Manning, P.A.

(57) ABSTRACT

The present invention is directed to optical devices. More specifically, the disclosed devices include a film defining a periodic array of surface elements so as to give rise to surface plasmon polaritons. The film also includes at least a single aperture having a diameter less than the wavelength of light. In one embodiment, the surface elements can be an array of anisotropic apertures and the films can act as a polarizer. The disclosed devices can also include a material having a variable refractive index substantially adjacent to the metal film. For example, the refractive index of the adjacent material can vary according to some characteristic of the light incident to the device, for instance, the intensity or the angle of incidence of the light. In this embodiment, resonant coupling of incident light with the SPP, and hence transmittivity of the device, can depend upon the nature of incident light. The disclosed devices can be useful in, for example, remote polarizers, polarization mode dispersion, isolators, multi-color displays, switches, such as can be controlled according to incident sunlight, or optical filters, such as for eye protection devices, filtering out possibly harmful light.

6 Claims, 4 Drawing Sheets

U.S. PATENT DOCUMENTS

| | | | |
|---|---|---|---|
| 5,155,779 | A | 10/1992 | Avramopoulos et al. |
| 5,208,705 | A | 5/1993 | Avramopoulos et al. |
| 5,617,232 | A | 4/1997 | Takemori |
| 6,021,141 | A | 2/2000 | Nam et al. |
| 6,040,936 | A | 3/2000 | Kim et al. |
| 6,236,033 | B1 | 5/2001 | Ebbesen et al. |
| 6,285,020 | B1 | 9/2001 | Kim et al. |
| 6,441,298 | B1 | 8/2002 | Thio |
| 6,571,035 | B1 | 5/2003 | Pi et al. |
| 6,649,901 | B2 | 11/2003 | Thio et al. |
| 7,110,154 | B2 * | 9/2006 | Ballato et al. ............... 359/245 |
| 2002/0056816 | A1 | 5/2002 | Stark |
| 2003/0036204 | A1 | 2/2003 | Stark et al. |
| 2003/0042487 | A1 | 3/2003 | Sarychev et al. |
| 2003/0048744 | A1 | 3/2003 | Ovshinsky et al. |
| 2003/0103150 | A1 | 6/2003 | Catrysse et al. |
| 2003/0173501 | A1 | 9/2003 | Thio et al. |
| 2003/0185135 | A1 | 10/2003 | Fujikata et al. |

OTHER PUBLICATIONS

Article—*Dynamical diffraction in metallic optical gratings*, M. M. J. Treacy, Applied Physics Letters, vol. 75, No. 5, Aug. 2, 1999, pp. 606-608.

Article—*Extraordinary optical transmission through sub-wavelength hole arrays*, T. W. Ebbesen, H. J. Lezec, H. F. Ghaemi, T. Thio, and P. A. Wolff, Letters to Nature, pp. 667-669, Feb. 1998.

Article—*One-mode model and Airy-like formulae for one-dimensional metallic gratings*, Ph. Lalanne, J. P. Hugonin, S. Astilean, M. Palamaru, and K. D. Möller, pp. 48-51, YR 2000.

Article—*Plasmon-assisted transmission of entangled photons*, E. Altewischer, M. P. van Exter, and J. P. Woerdman, Nature, vol. 418, Jul. 18, 2002, pp. 304-306.

Article—*Surface-plasmon-enhanced transmission through hole arrays in Cr films*, Tinke Thio, H. F. Ghaemi, H. J. Lezec, P. A. Wolff, and T. W. Ebbesen, J. Opt. Soc. Am. B, vol. 16, No. 10, Oct. 1999, pp. 1743-1748.

Article—*Surface-plasmon-enhanced transmission through metallic gratings*, U. Schröter and D. Heitmann, Physical Review B, vol. 58, No. 23, Dec. 15, 1998-I, pp. 15 419-15 421.

Article—*Surface plasmons enhance optical transmission through subwavelength holes*, H. F. Ghaemi, Tineke Thio, D. E. Grupp, T. W. Ebbesen, and H. J. Lezec, Physical Review B, vol. 58, No. 11, Sep. 15, 1998-I, pp. 6779-6782.

Article—*Transmission Resonances on Metallic Gratings with Very Narrow Slits*, J. A. Porto, F. J. Garcia-Vidal, and J. B. Pendry, Physical Review Letters, vol. 83, No. 14, Oct. 14, 1999, pp. 2845-2848.

* cited by examiner

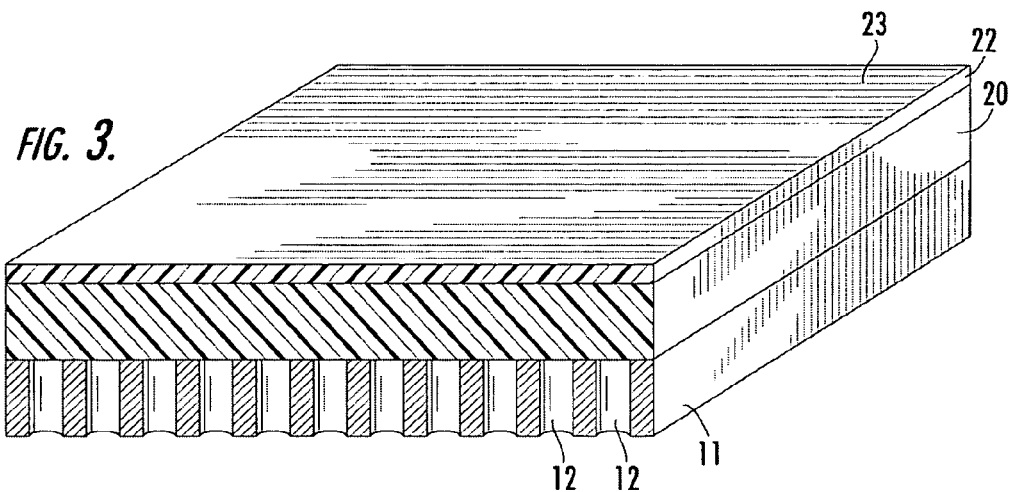
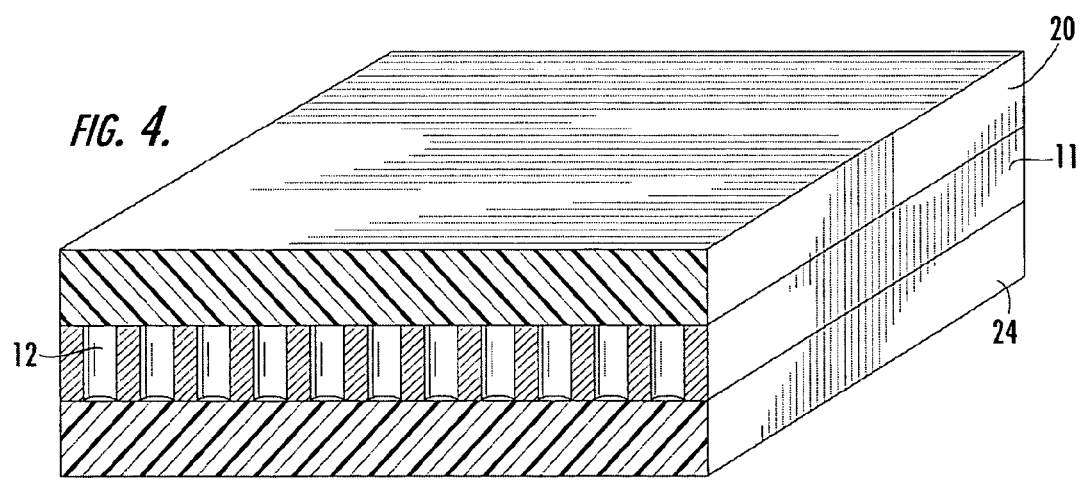

PLASMON-PHOTON COUPLED OPTICAL DEVICES

CRROSS REFERENCE TO RELATED APPLICATIONS

This application is a divisional application of U.S. patent application Ser. No. 10/865,237 having a filing date of Jun. 10, 2004 now U.S. Pat. No. 7,110,154.

BACKGROUND OF THE INVENTION

Over the last century, mankind has developed a growing understanding of the nature of light. This growing understanding has led to an increasing ability to harness and control light, which has in turn led to improvements in a wide variety of different technologies. For instance, the ability to control photons has led to improvements in communications, such as through the development of fiber optics; improvements in opto-electronics, such as through the development of photo-voltaic cells; as well as the development of near-field optics, a field of study dedicated to the utilization of near-field light, which is the light created around the periphery of an object emitting or being illuminated by light. The study of near-field light has brought about the development of and continuing improvements to many optical devices including many different types of imaging devices as well as optical scanners, filters, switches, modulators, and the like.

For many years, the low transmittivity of light waves through extremely small diameter holes, smaller than the wavelength of the incident light, was a limiting factor to the further development of near-field optical devices. Specifically, the transmission of light of a wavelength $\lambda$ through an aperture of diameter d, where d<$\lambda$, was found to be proportional to $(d/\lambda)^4$. (See for example published U.S. Patent Application 2003/0185135 to Fujikata, et al.) Recently, however, it has been discovered that the level of optical transmission through such holes can be strongly enhanced through the formation and utilization of a surface plasmon polariton band structure on the surface of the metal film containing the apertures. Specifically, the formation on a metal film of a periodic array of sub-light wavelength surface structural elements, e.g., holes, dimples, or concentric rings, can give rise to the formation of a well-defined series of surface plasmon polaritons on the film. Surface plasmon polaritons (also referred to throughout this disclosure as simply plasmons or SPP) exist when light couples with surface plasmons, which are collective electronic excitations at the interface of a metal (or metallic material) with an adjacent dielectric material. The SPP can be resonantly excited by the impingement of incident light of a particular wavelength. Specifically, the resonant coupling between the incident light and the plasmons exist at wavelengths that have been shown to be dependent upon the geometry of the periodic array formed on the material, the angle of incidence of the incident light, as well as the refractive index of the dielectric material adjacent to the metal film. The resonantly excited plasmons can propagate through the apertures in the metal film to the other side and, since their wave nature represents acceleration in electronic charge, they can subsequently reradiate the impinged light.

One of the net results of the resonant coupling of plasmons with incident light can be induced transparencies in nominally opaque materials that support a plasmon resonance (i.e., permittivity, $\epsilon$, being less than zero) when light of the correct wavelength strikes the materials. In addition, because the photon/plasmon interactions are so strong, the effects of the resonant coupling effect can be highly efficient. For instance, these structures can exhibit greater than 100% transmission when compared to the transmission expected from the total area defined by the holes.

Research is continuing in an effort to expand the application of these devices. For instance, Kim, et al. (U.S. Pat. No. 6,040,936), which is incorporated herein by reference, disclose an optical transmission modulation apparatus including a metal film having a periodic array of sub-light wavelength-diameter holes and a supporting layer including a material displaying a selectively variable refractive index. The material displaying a selectively variable refractive index can be, for example, a liquid crystal material, a ferro-electric liquid crystal, a semiconductor layer, or a polymer electro-optic film, i.e., materials in which the refractive index can be controlled through application of an electric field to the material.

Though such advances represent great improvement in the art, there remains room for variation and further improvement in the field.

SUMMARY OF THE INVENTION

In one embodiment, the presently disclosed invention is directed to an optical device that includes a film defining at least one aperture that has a diameter less than the wavelength of light. In addition, the film includes a periodic array of structural elements that can enable the excitation of an SPP on the film with the allowable energy and momentum that can provide for coupling of photons and plasmons.

Substantially adjacent to the film, the devices can include a first layer, for instance a substrate or a coating layer, that includes a material having a selectively variable index of refraction. More specifically, the refractive index of the first layer adjacent to the film can vary according to some characteristic of the light incident to the device. For example, the refractive index of the first layer can vary depending upon the intensity of incident light or angle of incidence of incident light.

The film of the optical device can be formed of any material that can give rise to a series of surface plasmons. For example, the film can be a metal or a heavily doped semi-conductor. In one embodiment, the film can be formed of silver, aluminum, chromium, gold, titanium, or an alloy thereof.

In one embodiment, the film can include a single aperture for transmission of light and the periodic array giving rise to the plasmons can be a periodic array of surface structures such as dimples, concentric rings, or the like. In another embodiment, the film can include an array of apertures for transmission of light that are also the surface structures that can give rise to the plasmons. Individual apertures in the film (whether in a film including a single aperture or an array thereof) can generally have a diameter of between about 50 and about 500 nanometers for visible to NIR light applications.

The periodicity of the structures giving rise to the SPP can vary as desired. For example, in one embodiment, the periodic array of surface elements can have a periodicity of between about 1.414·$\lambda_p$ and about 2 μm, wherein $\lambda_p$ is the plasma frequency, so as to give rise to plasmons of multiple modes.

The layer substantially adjacent to the film can include a nonlinear optical material that can exhibit a variable refractive index depending upon a characteristic of the incident light. For example, in some embodiments, the material can be one with nonlinear refractive index greater than about $10^{-16}$ cm$^2$/W. Suitable materials can include, but are not limited to: arsenic, sulfur, selenium, or germanium-containing chalcogenide glasses; silicon, germanium, or lead-containing oxide glasses; silicon, germanium, zinc, sulfur, selenium, cadmium, lead, or tellurium-containing semiconducting crystals; or nonlinear chromophore-containing polymers.

The devices of the disclosed invention can optionally include additional layers. For example, additional layers can be included on either side of the devices that can, for instance, sandwich the first layer between the film and an additional layer or optionally sandwich the film between the first layer and an additional layer. In one embodiment, the device can be a multi-layer device with additional layers on both sides of the device. Additional layers can be any suitable material. For example, in one embodiment, an additional layer can include a material having a variable index of refraction including, for instance, a variable index of refraction depending upon a characteristic of the incident light, similar to the first layer material, or an electro-optic material, in which the index of refraction can vary with regard to an electric field established across the material.

Devices of the disclosed invention can include, for example, optical switches, optical limiters, optical filters, and optical modulators. In particular, during use, light can be incident upon the devices. Depending upon the characteristics of the incident light, the index of refraction of the material forming the substantially adjacent first layer can vary. The wavelength of the incident light can then be altered to a second wavelength in accord with the index of refraction of the substantially adjacent first layer, and this light, at the second wavelength, can couple with the SPP of the film and can be emitted from the device.

In one particular embodiment, the disclosed devices can be self-regulating optical filters in which the incident light to the device can resonantly couple with the surface plasmons at a predetermined intensity. In this manner, the device can act as a filter to prevent transmission of light at intensities away from that which can resonantly couple with the device. For example, the device can be designed so that only low intensity light can couple with the plasmons and transmittivity of high intensity light is limited. For instance, in one embodiment, light with an intensity between about $10^2$ and about $10^{15}$ photons of green light per square centimeter per second can resonantly couple with the plasmons and exhibit enhanced transmittivity through the device, while transmission of higher intensity light can be limited or prevented.

In another embodiment, the present invention is directed to optical devices including a film as described above and included on the film can be two different periodic arrays of apertures that overlay each other. Both of the arrays can be formed of apertures in which the maximum cross-sectional dimension of the aperture is less than the wavelength of light. At least one of the arrays can be formed of high aspect ratio apertures, that is, apertures having differing length and width such that the ratio of length to width is greater than one. In one embodiment, the high aspect ratio apertures can have an aspect ratio greater than about two.

According to this embodiment, the second array of apertures can be formed of either anisotropic apertures or apertures of unity aspect ratio, as desired. For example, in one embodiment, both arrays can be formed of anisotropic apertures, and the major axes of the apertures of the two arrays can be normal to each other on the film.

Films of the present invention that include an array of anisotropic apertures, that is, apertures having an aspect ratio greater than one, can be utilized to modulate light in unique ways. For example, in one embodiment, a film including a periodic array of anisotropic apertures can be used to modulate polarized light, for instance polarized light critical to applications in display and optical fiber communications technologies. In this embodiment, polarized light can be incident to the film. In one embodiment, when the incident polarized light has an electric field that is parallel to the major axis of the anisotropic apertures, the incident light can be prevented from transmitting through the film. In the opposite case, when the incident polarized light has an electric field that is normal to the major axis of the anisotropic apertures, the incident light can be reradiated from the opposite surface of the film. Thus, in this embodiment, the disclosed devices can be utilized to modulate polarized light.

BRIEF DESCRIPTION OF THE DRAWINGS

A full and enabling disclosure of this invention, including the best mode to one of ordinary skill in the art, is set forth in this specification including the following Figures in which:

FIG. 3 illustrates another embodiment of the disclosed invention including a perforated film adjacent a supporting substrate layer and an additional auxiliary layer adjacent the supporting substrate layer;

FIG. 4 illustrates another embodiment of the disclosed invention including a perforated film sandwiched between two supporting substrate layers;

Figure 1:
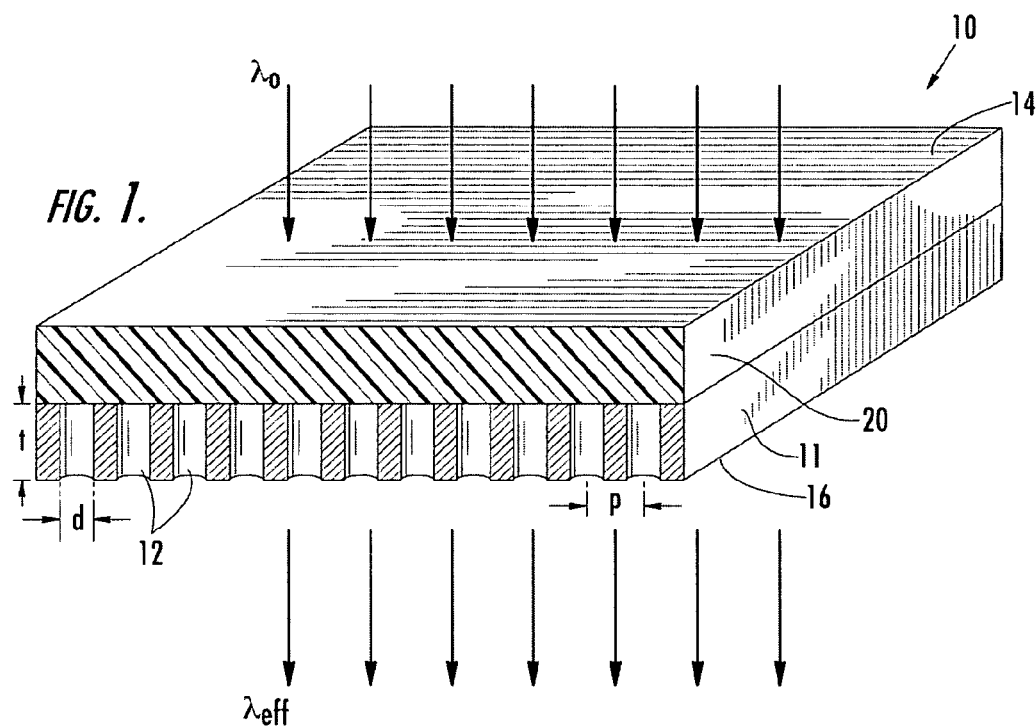
FIG. 1 illustrates one embodiment of the disclosed invention including a perforated film adjacent to a dielectric substrate layer and showing incident light striking the device from the side of the device including the dielectric substrate layer.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used in another embodiment to yield a still further embodiment. Thus, it is intended that the present invention cover such modifications and variations as come within the scope of the appended claims and their equivalents.

In one embodiment, the present invention is directed to optical devices in which the nature of light transmitted through the device can be dependent upon the nature of the incident light, i.e., self-regulated transmissive devices. More specifically, the disclosed devices can be plasmon-enhanced optically transmissive devices in which the transmissive characteristics of the device can depend upon certain characteristics of the incident light. For instance, in one embodiment, the intensity of the incident light can effectively determine the transmittivity of the device. In another example, the angle of incidence of the incident light can determine the transmittivity of the device.

For purposes of this disclosure, transmittivity is herein defined to be the transmission efficiency of light at a particular wavelength through a device perforated with sub-light wavelength diameter hole(s).

In another embodiment, the invention is directed to films including a periodic array of sub-light wavelength anisotropic, high aspect ratio apertures such that the films are polarization sensitive. In this particular embodiment, the films can transmit incident light that is of a particular alignment with the perforated film. As such, the device can act as a light polarizer or a polarization converter.

In one embodiment, the invention is directed to optical devices including two different periodic arrays that overlay one another on a single film, wherein at least one array is formed of anisotropic apertures. In this embodiment, the devices can be utilized to, for instance, transmit multiple colors from a single region of the device.

Utilization of the disclosed optical devices can provide self-regulated as well as highly efficient and fast optical devices such as optical switches, modulators, filters, and limiters based on the incident light intensity, polarization, or an externally applied electric field. For example, in one embodiment, the disclosed devices can be employed as a wavelength selective filter, wherein only light in a relatively narrow range of incident intensity can be transmitted by the device. Such devices can be utilized in, for example, optical sensors or eye protection applications, polarization maintaining devices, and/or polarizers for displays. Similarly, the disclosed devices can be utilized in self-regulated optical switching or modulating applications. For instance, the disclosed devices can be utilized in remote switching or modulating applications wherein the device is self-regulated based upon the incident light to the device.

The optical devices of the disclosed invention include a film that has been etched, milled, or otherwise shaped to include a periodic array of surface elements that can give rise to the formation of surface plasmons on the film when the film is impinged by light. In addition, the film can include at least one aperture having a diameter less than the wavelength of the incident light. The film is formed of a material that is capable of giving rise to plasmons, for example the film can be a metallic film.

In one embodiment, substantially adjacent to this film, the disclosed devices can also include a dielectric layer through which light can pass. As the light passes through the adjacent layer, the wavelength of the light can be variably altered depending upon the nature of the incoming light. More specifically, the layer can be formed of or otherwise include a material that has a refractive index that depends upon a characteristic of the incoming light. As such, the transmittivity of the incident light through the device can be self-regulated and can depend upon the nature of the incoming light.

Referring to FIG. 1, a portion of an optical device generally 10 according to the present invention is illustrated. As can be seen, device 10 can include a film 11 that has been formed to include an array of circular apertures 12 of a diameter d set at a periodic spacing p. Film 11 can generally be a metal film, though in certain embodiments, film 11 can be formed of other suitable materials such as, for example, a heavily-doped semi-conductor material. A non-limiting exemplary list of materials suitable for forming film 11 can include silver, aluminum, chromium, gold, titanium, or alloys thereof.

As the basic nature of the transmission of light through a sub-light wavelength perforated film is generally known in the art, a detailed description of the phenomenon will not be included here. Suffice it to say that the transmittivity of light at a given wavelength can depend upon the coupling of the light at that wavelength with SPP, with maximum transmission occurring at resonant coupling. Thus, the transmission peaks depend upon the characteristics of the SPP formed which can depend upon both the geometry of the individual surface elements as well as the periodicity of the array formed, which together give rise to the plasmons. As such, physical characteristics of the system, including diameter d, periodicity p, and thickness t of the film 11 can be varied as is generally known in the art in order to form a device that can couple with light of a specific wavelength. In general, however, the diameter or maximum width (in the case of non-circular apertures) of apertures 12 can be less than the wavelength of the maximum wavelength $\lambda$ of interest. For example, where a well-defined transmission peak is of interest, each aperture can have a diameter on the order of about $0.1\lambda$. In those embodiments wherein large transmission is of interest, the apertures can be larger, for example, on the order of $0.5\lambda$. For example, in one embodiment, d can be between about 50 and about 500 nanometers for transmission of visible to NIR light.

The thickness t of film 11 can be large enough such that the film is opaque to light, however, thickness t of film 11 can vary over a relatively wide range. For instance, thickness t can be between about 4 and about 40 times the optical skin depth of the particular material forming film 11. In one embodiment, thickness t of film 11 can be about 5 times the optical skin depth of the material. For purposes of this disclosure, the optical skin depth of a material is herein defined as that penetration distance where the electric field intensity is $(1/e)$ of the incident electric field intensity.

In the embodiment illustrated in FIG. 1, film 11 defines an array of circular apertures 12 at a periodic distance p from one another. Whether formed of apertures, as in FIG. 1, or formed of purely superficial elements, such as surface dimples or concentric rings, the periodicity p for any array of the disclosed invention can generally be between about 300 nm and about 2000 nm. In one embodiment, the periodicity can be between about 450 and about 1000 nm.

Apertures 12 can be formed according to any process as is generally known in the art. For instance, in one embodiment, the film 11 can be perforated utilizing a focused ion beam, for example a focused ion beam using gallium ions. Alternative perforation methods can be utilized, however, including electron-beam fabrication methods, holographic embossing technology, or self-assembly of polymer spheres at the surface of a substrate that can then be used as a mask pattern or template for fabricating the holes, as described by C. Haginoya, et al., "Nanostructure array fabrication with a size-controllable natural lithography," *Applied Physics Letters*, Vol. 71, No. 20, pp. 2934–2936 (Nov. 17, 1997), which is incorporated herein by reference thereto.

It should be understood that the perforated film of the disclosed invention is not limited to the particular embodiment illustrated in FIG. 1. For example, in other embodiments, the film can include apertures of a different cross-sectional shape, including, for instance, apertures which vary in cross-sectional shape or size across the depth of the film as well as variations in shape of the apertures themselves, e.g. squares, rectangles, ellipses, etc. as opposed to the illustrated circular apertures, particular embodiments of which will be discussed below.

Optionally, the film can include only a single aperture for light transmission in combination with a series of superficial surface elements such as dimples or concentric rings that give rise to the formation of the plasmons on the film. In this embodiment, the surface elements can be formed according to any suitable process known in the art, e.g., etching, milling, deposition of the metal onto structured dielectrics, and the like. Moreover, the array of surface elements, whether superficial or penetrating elements, can be any periodic array as is generally known in the art, including, for example, rectangular arrays, triangular arrays, and the like.

Referring again to FIG. 1, device 10 includes a layer 20 substantially adjacent to film 11. For purposes of this disclosure, the term 'substantially adjacent' is herein defined as being either in direct contact with or within an effective distance of the metal film 11. More specifically, any distance between the metal film 11 and the layer 20 should be less than the distance at which the plasmons of the metal film 11 can no longer interact with the layer 20, i.e., less than the distance at which the e-field intensity falls to 1/e for the dielectric material in the intervening space. Material in the intervening space may be any dielectric material including a vacuum, air, or some other dielectric material, each of which would have a characteristic allowable depth. The depth of this intervening material need be small enough to assure that plasmons arising on film 11 can still interact with the layer 20. For example, in one embodiment, the metal film 11 can be at a distance from the layer 20 of less than about 200 nm, though the preferred distance can obviously vary depending upon the particular materials of the device. It should be understood, however, that this particular exemplary range is in no way intended to limit the scope of the invention.

Layer 20 can, in one embodiment, be formed exclusively of a dielectric material with a variable refractive index. In another embodiment, layer 20 can include such a material in its make-up without necessarily being formed exclusively of that material.

The index of refraction of the layer 20 is variable. Moreover, this variation can depend upon one or more characteristics of the incoming light. For example, in one particular embodiment, layer 20 can be formed from a nonlinear optical material in which the index of refraction of the layer 20 can vary depending upon the intensity of the incoming light.

In one embodiment, the material can be one possessing large second and third order susceptibilities. A non-limiting list of possible materials for layer 20 can include arsenic (As), sulfur (S), selenium (Se), or germanium (Ge)-containing chalcogenide glasses, silicon (Si), germanium (Ge), or lead (Pb)-containing oxide glasses, silicon (Si), germanium (Ge), zinc (Zn), sulfur (S), selenium (Se), cadmium (Cd), lead (Pb), or tellurium (Te)-containing semi-conducting crystals, or nonlinear chromophore-containing polymers.

Other possible materials for layer 20 can include second-order nonlinear crystals such as β-barium borate, gallium arsenide, gallium phosphide, silicon carbide, indium arsenide, indium antimonide, indium gallium arsenide, indium gallium phosphide, indium gallium arsenide phosphide, lead niobate, lead titanate, lead zirconate titanate, lithium niobate, lithium borate, potassium dihydrogen arsenatem potassium dihydrogen phosphate, potassium titanyl arsenate, potassium titanyl phosphate (as well as cesium and rubidium analogs), strontium titanate, zinc oxide, zinc sulphide, zinc selenide, lead sulphide. Organic second and third order nonlinear materials also are considered for these devices with specific exemplary materials including those disclosed in R. Sutherland, "Handbook of Nonlinear Optics," (Marcel Dekkar, New York, 1996) and the Handbook of Photonics, M. Gupta, ed., (CRC Press, Boca Raton, Fla., 1997), which are incorporated herein by reference.

The thickness of layer 20 can vary widely. For instance, in one embodiment, layer 20 can be very thin, such as a film or a coating formed on metal film 11. In another embodiment, layer 20 can be thicker, for instance, layer 20 can be a free-standing substrate layer 20 such as may be placed adjacent to metal film 11 following independent formation of layer 20. For instance, in one embodiment, layer 20 can give support and definition to film 11.

In general, the wavelength of light passing through a dielectric material will be effected by the refractive index of the material in a know manner, such that $$\lambda_{eff} = \frac{\lambda_o}{\eta_{eff}}$$

where:
$\lambda_{eff}$ is the wavelength of light in the dielectric
$\lambda_o$ is the freespace wavelength of the light and
$\eta_{eff}$ is the effective index of refraction of the material.

When considering nonlinear optical materials, the effective refractive index of the material can vary depending upon some exterior property acting upon the material. For instance, when considering a nonlinear material in which the index of refraction can vary depending on the intensity of the light directed at the material, the wavelength of light through the material can be described as:

$$\lambda_{eff} = \frac{\lambda_o}{\eta_0 + \eta_2 I}$$

where
$\eta_0$ is the nominal refractive index of the material,
$\eta_2$ is the nonlinear refractive index,
$(\eta_2 I)$ is the change to the refractive index to the material under light of intensity I, and
$\eta_0 + \eta_2 I$ is the intensity dependant refractive index Thus, as the intensity I of light directed at the material increases, the effect on the refractive index of the material, and hence the wavelength of light through the material, will also change.

As previously mentioned, in one embodiment, materials for the nonlinear optical layer substantially adjacent the metallic film can include those having large third order susceptibilities. The nonlinear refractive index, $\eta_2$, is related to the third order susceptibility, $\chi^{(3)}$, by:

$$\eta_2 = [\chi^{(3)} \times 3/(4\eta_0)]$$

In one embodiment, the nonlinear optical material of the present invention can be one in which the nonlinear refractive index, $\eta_2$, is greater than about $10^{-16}$ cm$^2$/W.

In this embodiment, the nature and characteristics of the incident light to the device can determine the transmittivity of the optical devices of the present invention.

For instance, in the embodiment shown in FIG. 1, incident zero-order light including light at a wavelength $\lambda_o$ is directed at device 10 including metal film 11 and layer 20. Layer 20 includes a nonlinear optical material in which the effective wavelength of light through the material is dependent upon the intensity of the incident light, i.e., $$\eta_{\textit{eff}} = \eta_0 + \eta_2 I \text{ and } \lambda_{\textit{eff}} = \frac{\lambda_o}{\eta_{\textit{eff}}}$$

In addition, metal film 11 has been formed to include an array of apertures 12 of a diameter d set at a periodic spacing p so as to give rise to SPP that can resonantly couple with light at a desired wavelength $\lambda_{\textit{eff}}$. Thus, when the incident light is at an intensity I so as to yield refractive index $\eta_{\textit{eff}}$ from layer 20, the light can resonantly couple to the plasmons and the transmittivity of the light at $\lambda_{\textit{eff}}$ can be greatly enhanced. Thus, the disclosed devices can be self-regulating in that an inherent characteristic of the incident light can control the transmittivity of the light through the device.

Figure 2:
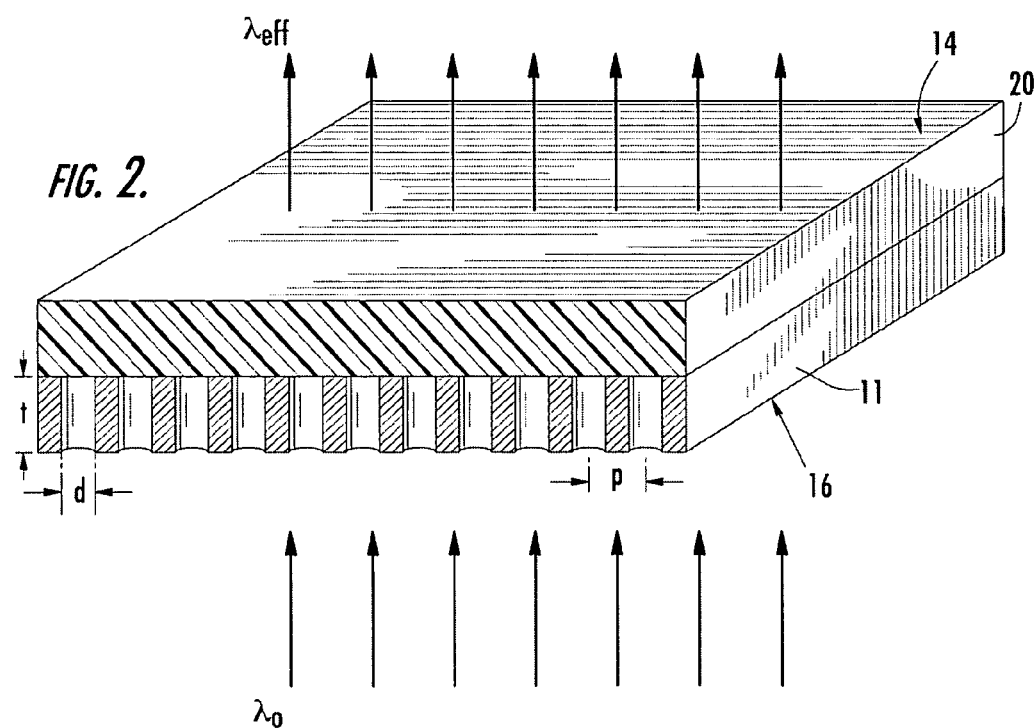
FIG. 2 illustrates the embodiment shown in FIG. 1, with the incident light striking the device from the side of the device including the perforated film.

Beneficially, the resonant coupling of light with plasmons can occur on either side of the device and the transmittivity of the device can still be enhanced. For example, in the embodiment illustrated in FIG. 2, the layer 20 can be substantially adjacent to the metal film 11 on the side 14 of the device, which, in this embodiment, is the side of the device that can emit light. This is opposite to the embodiment illustrated in FIG. 1, in which the side 14 is receiving the incident light. In the embodiment illustrated in FIG. 2, the incident light to the device at side 16, including zero-order light at a wavelength $\lambda_o$, can still have a certain amount of coupling to the plasmons, though not necessarily resonant coupling, and can describe a small amount of transmittivity. The photons reradiated by the plasmons from the film 11 in FIG. 2 will still describe light at a wavelength $\lambda_{\textit{eff}}$, however, due to the nonlinear optical dielectric layer 20 substantially adjacent to the metal film on this side of the film, and this light, at $\lambda_{\textit{eff}}$ can resonantly couple to the plasmons, with the net effect of the transmittivity of the light incident to side 16 of device 10 in FIG. 2 being the same as that for the embodiment illustrated in FIG. 1, when the light was incident to side 14 of the device. In other words, when resonant coupling between plasmons and photons occurs at any interface of a metallic film with an adjacent dielectric material, the transmittivity of the light through the device at that wavelength can be substantially enhanced.

There are many applications for the disclosed optical devices. For instance, the disclosed devices can be utilized in applications allowing preferential transmission of light of a particular nature. For example, in one embodiment, the devices can be utilized for enhancing the transmission of low intensity light, while limiting the transmission of high intensity light. This may find application, for instance, in long-range sensing applications such as astronomical observations. In another embodiment, the devices can be utilized in eye protection devices, preventing the transmission of possibly harmful high intensity light. In this particular embodiment, the devices can be designed such that resonant coupling between the incident light and the plasmons occurs only at low intensities, i.e., the wavelength at which light can resonantly couple to the plasmons, $\lambda_c$, can correspond to the wavelength obtained from the substantially adjacent layer 20 a low intensity light, or $$\lambda_c = \lambda_{\textit{eff}} = \frac{\lambda_o}{\eta_0 + \eta_2 I},$$

when $\eta_2 I \sim 0$

In this embodiment, as $\eta_2 I$, the change to the refractive index to the material under light of intensity I, increases with increasing intensity, the wavelength of light through the layer 20, $\lambda_{\textit{eff}}$, will shift away from the resonant coupling wavelength, $\lambda_c$, and the transmittivity of the device can decrease. Thus, in this particular embodiment, the device can efficiently transmit light of low intensity, but can limit transmission of light at higher intensities.

In other embodiments, the devices of the present invention can find application as remote, self-regulating switches. For example, the devices can be included in switching apparatuses designed to activate at only specific intensities of incident light, which can be natural light (e.g., sunlight, moonlight; starlight) or man-made light.

As is generally known, the intensity of the light incident upon a surface can depend not only on the nature of the light itself, but also upon the angle of incidence of the light. As such, in those embodiments wherein the refractive index of an adjacent layer varies according to the intensity of the incident light, the self-regulated control of the disclosed devices can optionally depend upon the incident angle of the light. For example, in one particular embodiment of the present invention, the disclosed devices can operate in an outdoor environment. In this embodiment, the devices can be designed so as to achieve maximum transmission at a light intensity that can be expected at a specific angle of incident sunlight, i.e., at a specific time of day. Similarly, the disclosed devices can operate in an environment in which the device can rotate under a light source. In this embodiment, the device can be designed so as to achieve maximum transmission of light at a specific angle of rotation that describes the target angle of incidence, providing incident light at the target light intensity to the device.

The disclosed devices can optionally include additional layers and materials in conjunction with the metal films and the adjacent layer. For example, referring to FIG. 3, in one embodiment, the disclosed devices can include an additional layer 22 adjacent to the layer 20. Additional layer 22 can include a single layer of a material or can include more than one layer of homogeneous or heterogeneous materials. For instance, layer 22 can be a flexible layer or a rigid layer, as desired. In one embodiment, layer 22 can include a transparent material such as can offer additional mechanical supporting or connecting capabilities to the device, for example, a polymer, a sapphire, a glass, or a quartz material.

In another embodiment, layer 22 can provide an additional control mechanism to the device. For example, in one embodiment, layer 22 can include a material having a selectively variable index of refraction that can be controlled according to an applied electrical field. For example, layer 22 can include an electro-optic material, a liquid crystal material, or a semiconductor layer. For instance, layer 22 can include selectively variable refractive index materials such as those disclosed by Kim, et al., previously incorporated by reference. In this particular embodiment, the device can include a transparent conductive layer 23 at the surface of layer 22, as shown. During use, the metal film 11 and the transparent conductive layer 23 can function as electrodes to create an electric field that can be utilized to control the index of refraction of the layer 22. The transparent conductive layer can be, for example, an indium tin oxide layer, as is generally known in the art.

Yet another embodiment of the present invention is illustrated in FIG. 4. In this embodiment, metal film 11 can be sandwiched between layer 20 and layer 24. Layer 24 can include a single layer of a material or can include more than one layer of homogeneous or heterogeneous materials, as described above for layer 22. For example, layer 24 can include a transparent rigid or flexible substrate such as a polymer, quartz, glass, or sapphire substrate that can protect or otherwise mechanically enhance the device. Optionally, layer 24 can provide additional transmittivity control to the device. For example, layer 24 can include a non-linear optical material the same or different as that of layer 20. Additionally, layer 24 can include a material having a selectively variable index of refraction that can be controlled according to an applied electrical field, as described above for layer 22.

In another embodiment, the invention is directed to films that are polarization-sensitive. According to this embodiment, the film can include an array of apertures that are anisotropic, that is, apertures that have an aspect ratio greater than one. According to the present disclosure, aspect ratio is herein defined as the ratio of the length of the major axis of the aperture to that of the minor axis. Accordingly, high aspect ratio or anisotropic apertures includes, for instance, rectangles, ellipses, and the like. In one embodiment, a metal film of the present invention can include a periodic array of apertures, each of which having an aspect ratio greater than about two. For example, rectangular or elliptical apertures having a major axis of up to about 500 nm and a minor axis less than the major axis can be formed. In one particular embodiment, a regular array of anisotropic apertures can be formed on a film each of which having a major axis of about 220 nm and a minor axis less than 220 nm, for example between about 60 nm and about 200 nm.

Figure 5:
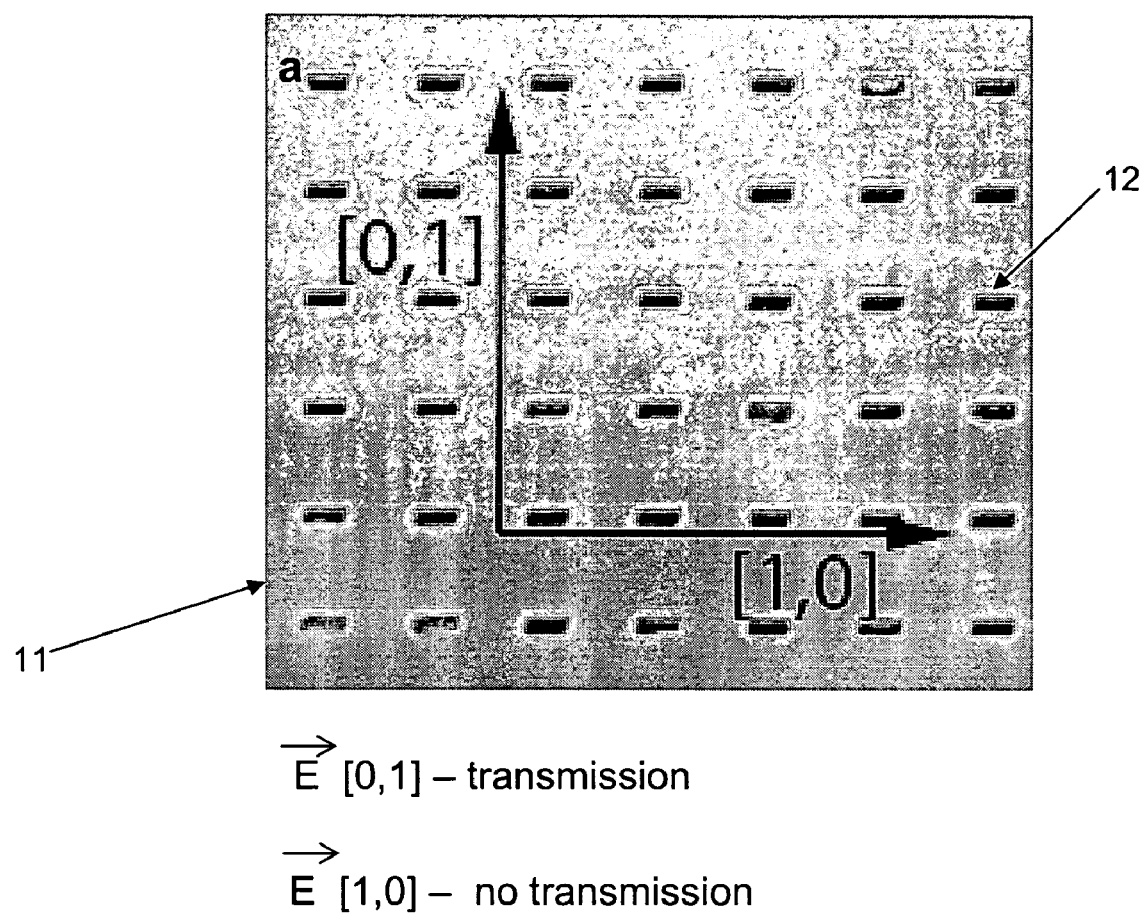
FIG. 5 illustrates a perforated film including a periodic array of high aspect ratio apertures.

FIG. 5 illustrates one embodiment of a film including a single array formed of multiple high aspect ratio apertures 12. It has been discovered that films including such high aspect ratio apertures can transmit polarized light when the electric field (E field) of linearly polarized incident light is normal to the major axis of the apertures 12, with decreasing transmission as the electric field rotates away from normal. As shown in FIG. 5, when the E field is normal to the major axis of the apertures 12, that is, in the [0,1] direction, transmission maximum occurs, however when the E field of the incident polarized light is rotated by 90°, such that it is parallel to the major axis, in the [1,0] direction, little or no transmission will occur. In addition, it has been found that the higher the aspect ratio, the less the transmittivity through the film when the E field is parallel to the major axis. That is, as the aspect ratio approaches unity (a square or circular aperture) the transmission characteristics of the film become less selective as to the polarization characteristics of the incident light, while at a higher aspect ratio, for example a ratio of about 2:1 or greater, essentially no polarized light will be transmitted when the electric field of the incident light is parallel to the major axis of the high aspect ratio apertures.

According to this embodiment, the disclosed films can be polarizing films. Accordingly, in one embodiment of the present invention, incident polarized light may be selectively transmitted by the disclosed devices by merely changing the orientation of the incident polarized light with respect to the film.

In another embodiment, non-polarized light can be incident upon a film of the present invention including an array of high aspect ratio apertures, and the film can act as a polarizer. In particular, the unpolarized incident light can be transmitted as linearly polarized light due to the selective transmission of the array of high aspect ratio apertures.

In all other ways, films of this particular embodiment, that is, those including arrays of high aspect ratio apertures, appear to behave the same as films including arrays of apertures having an aspect ratio of one, i.e., square or circular apertures. For example, the particular wavelength of the polarized light that can couple with SPP and be efficiently transmitted through the anisotropic can vary depending upon the length of the major axis of the apertures as well as on the periodicity of the array and the thickness of the film, as is generally known in the art and discussed previously.

In one embodiment, a film including at least two different overlying arrays, can be utilized to pattern two separate color transparent structures in the same region of a perforated film. In particular, one of the arrays can be an anisotropic polarizing array, as discussed above. According to this embodiment, a single film can be patterned with two or more different overlying arrays of apertures. For example, in one embodiment, two arrays of anisotropic apertures having different periodicities a and b can be formed on a single metal film with the major axes of the apertures of the two arrays normal to one another. According to this embodiment, when the E field of the incident polarized light is normal to the major axis of apertures having a periodicity a, the emission can have the corresponding peaks at A nm. When the E field of the linearly polarized light is rotated 90° and is now normal to the apertures with a periodicity b, the transmission peak can shift to B nm. In this way, one region of a film can transmit multiple colors. This device can have applications, for instance, in color-shifting pixel technology and can significantly improve the resolution of optical displays.

Figure 6:
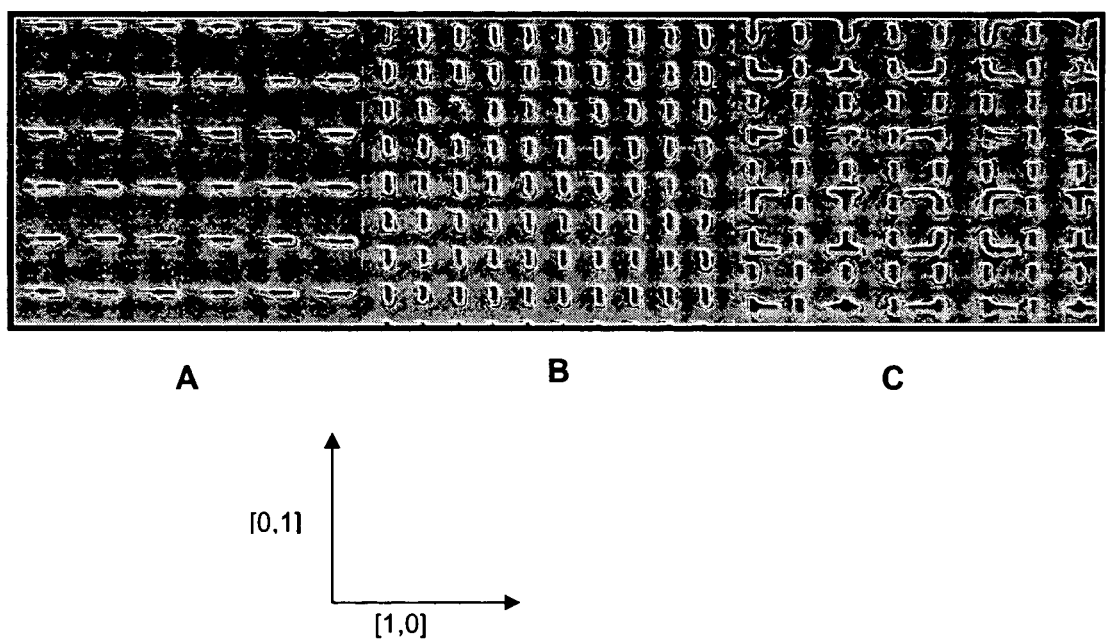
FIGS. 6A–6C illustrate the arrays of a perforated film including two overlaying periodic arrays, both arrays being formed of high aspect ratio apertures.

FIG. 6 illustrates one example of this embodiment. FIG. 6A illustrates a film including a first array of anisotropic apertures, designed in this particular embodiment to emit 650 nm linearly polarized light in the [0,1] direction, as shown on the coordinate in the Figure. FIG. 6B illustrates a second film including a second array of anisotropic apertures, designed to emit 550 nm linearly polarized light in the [1,0] direction, as shown. FIG. 6C illustrates a single film including both arrays, overlying each other. The film of FIG. 6C can thus emit both 650 nm light and 550 nm light, but the emission characteristics can depend upon the electric field of the incident light. In particular, the film can emit 650 nm light when the incident light is polarized in the [0,1] direction and can emit 550 nm light when the incident light is polarized in the [1,0] direction.

In another embodiment, one of the overlapping arrays can include anisotropic geometry and another array can include isotropic geometry. In this embodiment, the two arrays have been shown to interact with one another, with the result being the suppression of the modes that are interrupted. This is in contrast to films including overlying polarizing apertures, in which each structure appears to be unaffected by the other. According to this embodiment, the structure of the array can be designed to modulate the emission for a specific color. Such structures can be used, for example, to create color-shifting pixels.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. An optical device comprising:
    a film defining a first periodic array of apertures therethrough, each aperture of the first array having an aspect ratio greater than one, wherein the major axis of each aperture is less than the wavelength of light, wherein surface plasmon polaritons arise on the film when light strikes the surface of the film; and
    the film further defining a second, different periodic array of apertures therethrough, each aperture of the second array having a maximum cross-sectional dimension less than the wavelength of light, wherein the first and second periodic arrays overlay each other on the film.

2. The optical device of claim 1, wherein the apertures of the first periodic array each have an aspect ratio greater than about 2.

3. The optical device of claim 1, wherein the apertures of the second periodic array are of unity aspect ratio.

4. The optical device of claim 1, wherein the apertures of the second periodic array are anisotropic apertures having an aspect ratio greater than 1.

5. The optical device of claim 4, wherein the major axis of the apertures of the first array is normal to the major axis of the apertures of the second array.

6. The optical device of claim 1, further comprising a layer substantially adjacent to the film, wherein the layer comprises a material having a selectively variable index of refraction.

* * * * *

UNITED STATES PATENT AND TRADEMARK OFFICE
CERTIFICATE OF CORRECTION

PATENT NO. : 7,206,114 B2  Page 1 of 1
APPLICATION NO. : 11/517780
DATED : April 17, 2007
INVENTOR(S) : Ballato et al.

It is certified that error appears in the above-identified patent and that said Letters Patent is hereby corrected as shown below:

Column 1, line 4 please delete "CRROSS" and insert -- CROSS --

Column 1, line 10 please insert the following:

-- STATEMENT REGARDING FEDERALLY SPONSORED RESEARCH AND DEVELOPMENT
The captioned invention was made with Government support under N66001-03-1-8900 awarded by the Office of Naval Research. The Government has certain rights in this invention. --

Signed and Sealed this

Thirteenth Day of May, 2008

JON W. DUDAS
*Director of the United States Patent and Trademark Office*